United States Patent [19]

Lambert, Jr. et al.

[11] Patent Number: 4,594,228
[45] Date of Patent: Jun. 10, 1986

[54] MIXING APPARATUS

[75] Inventors: Joseph M. Lambert, Jr., Aurora; Stephen C. Paspek, Jr., North Royalton, both of Ohio

[73] Assignee: The Standard Oil Company, Cleveland, Ohio

[21] Appl. No.: 790,784

[22] Filed: Oct. 21, 1985

Related U.S. Application Data

[63] Continuation of Ser. No. 612,627, May 21, 1984, abandoned.

[51] Int. Cl.$^4$ .......................... B01J 8/02; B01F 7/18; B01F 7/22
[52] U.S. Cl. .................................. 422/218; 261/93; 366/305; 366/329; 366/330; 422/135; 422/224; 422/228
[58] Field of Search .............. 366/168, 194, 264, 270, 366/295, 305, 329, 330; 422/135, 192, 218, 224, 228; 261/93

[56] References Cited

U.S. PATENT DOCUMENTS

| | | | |
|---|---|---|---|
| 547,597 | 10/1895 | Brantingham | 366/329 X |
| 656,123 | 8/1900 | Kempf | 366/329 X |
| 2,639,129 | 5/1953 | De Rosset | 261/93 |
| 2,663,236 | 12/1953 | Blankenship, Jr. et al. | 366/270 |
| 3,376,109 | 4/1968 | Stedman | 422/218 X |
| 3,758,279 | 9/1973 | Whitesides | 422/192 |
| 3,892,388 | 7/1975 | Wass et al. | 366/329 |
| 4,243,636 | 1/1981 | Shiraki et al. | 422/228 X |

FOREIGN PATENT DOCUMENTS 515640  11/1920  France ........................... 366/329

OTHER PUBLICATIONS

Autoclave Engineers, Inc. MagneDrive II Autoclaves catalog.
Autoclave Engineers, Inc., Drawing No. 40A-2445-2.

Primary Examiner—Philip R. Coe
Attorney, Agent, or Firm—Salvatore P. Pace; David J. Untener; Larry W. Evans

[57] ABSTRACT

A mixing apparatus is disclosed which comprises a vessel; first impeller means positioned within said vessel immediately subjacent to the top of said vessel but sufficiently spaced from said top to rotate; second impeller means positioned within said vessel immediately superjacent to the bottom of said vessel but sufficiently spaced from said bottom to rotate; third impeller means positioned within said vessel between said first and said second impeller means; paddle means positioned within said vessel between said second and said third impeller means; and means for rotating said first, second and third impeller means and said paddle means.

32 Claims, 2 Drawing Figures

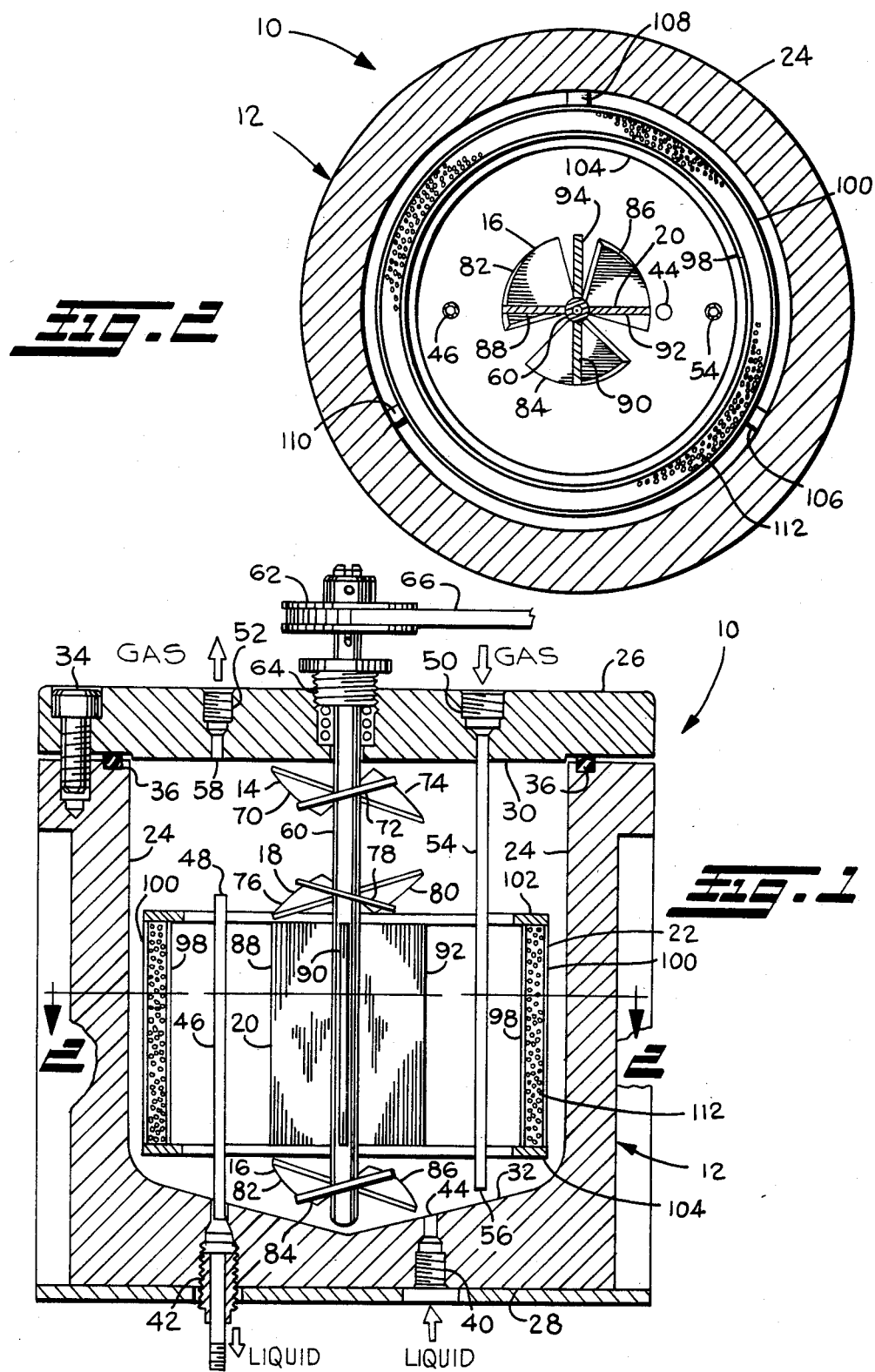

MIXING APPARATUS

This is a continuation of co-pending application Ser. No. 612,627 filed on May 21, 1984, abandoned.

TECHNICAL FIELD

This invention relates to mixing apparatus and, more particularly, to mixing apparatus that is adapted for mixing two or more phases, e.g., gas/liquid, liquid/liquid, liquid/solid, gas/liquid/solid. This invention is particularly suitable for achieving continuous stirred tank reactor performance.

BACKGROUND OF THE INVENTION

Accurate measurements of chemical reaction rates can only be accomplished with data obtained from reactors operated at two specific extremes of mixing. The first of these extremes is referred to as a plug flow reactor. Plug flow reactors are sometimes referred to as slug flow, piston flow, tubular flow or non-backmixing flow reactors. These reactors are characterized by the fact that flow of fluid through the reactor is orderly with no element of fluid overtaking any other element. Consequently, no diffusion along a flow path and no difference in velocity for any two elements of flowing fluid are permitted. The second of these extremes is the continuous stirred tank reactor. Continuous stirred tank reactors are sometimes referred to as backmix, total backmix or constant flow stirred tank reactors. In these reactors, the contents are well stirred and uniform in composition throughout. Thus the exit streams from these reactors have the same composition as the fluid within them. Reactions performed in a continuous stir tank reactor can be evaluated with relatively simple, algebraic equations. Reactions performed in a plug flow reactor can be evaluated with more complex mathematics, involving integration of space/time relationships. Reactors which do not approximate either of these mixing extremes can only be evaluated with the use of a great number of assumptions which leads to inherent uncertainties.

To avoid these uncertainties, large commercial size reactors are usually operated at high throughputs. These conditions usually approximate plug flow conditions. It is these conditions which permit, for example, the scale-up of pilot-plant data to commercial size reactors. The achievement of plug flow conditions in small laboratory reactors is, however, very difficult and usually impossible.

The difficulty with achieving plug flow conditions in small laboratory reactors has led to the search for laboratory reactors which can be operated as continuous stirred tank reactors. From such continuous stirred tank reactors, kinetic parameters can be accurately obtained. The data obtained from such continuous stirred reactors can be used in plug flow equations, permitting design of commercial-size reactors operated in the conventional configuration.

The simplest form of a continuous stirred reactor is an empty vessel in which two gaseous reactants are introduced to form a single product. All three fluids are continuously well mixed due to the limited mass transfer resistance exhibited.

The mixing of two miscible liquids with similar density is slightly more difficult due to the lower diffusivities of liquids relative to gases. However, if the liquids are of significantly different densities or are not miscible, intense stirring by mechanical means is necessary to prevent the pooling of the heavier liquid phase on the bottom of the reactor. Such segregation tends to inhibit attempts to operate the reactor as a continuous stirred tank reactor.

Heterogeneous systems containing liquids, gases and solids (e.g., solid catalysts) are significantly more complex. A simple slurry of a catalyst in liquid phase is possible if the catalyst density is approximately the same as that of the liquid. However, special efforts must be taken to assure the absence of catalyst stratification in the liquid phase and to provide a means of gas phase draw-down into the liquid phase. The presence of gas bubbles in the liquid phase often decreases the apparent density of the liquid phase relative to the catalyst density and leads to catalyst segregation at the bottom of the reactor. Consequently, mechanical means, such as catalyst baskets, are often used to support catalysts.

A number of laboratory reactor designs have been tested with the goal of achieving continuous stirred tank reactor performance. One of these designs involves different configurations of rotating catalyst baskets immersed in the fluid phase. Another of these designs has a centrally-located fixed bed of catalyst and internally recycles the fluid phases through it. Still another design places the catalyst in an annular fixed bed. The fluid is circulated through the bed by the flat vanes of a centrally located impeller. The fluid then flows vertically along the reactor walls and is directed back to the reactor center by pitched impellers located above and below the flat impeller on the same rotating shaft. A problem that has plagued each of these designs is the formation of pockets of stagnant fluid which is detrimental to obtaining continuous stirred tank reactor performance.

It would be advantageous to provide a mixing apparatus suitable for achieving continuous stirred tank reactor performance. It would be particularly advantageous if such continuous stirred tank reactor performance could be achieved when multi-phase mixing is required.

SUMMARY OF THE INVENTION

The present invention contemplates the provision of a mixing apparatus that is suitable for achieving continuous stirred tank reactor performance. This mixing apparatus is particularly suitable for achieving such performance when multi-phase mixing is required.

Broadly stated, the present invention provides for a mixing apparatus comprising: a vessel; first impeller means positioned within said vessel immediately subjacent to the top of said vessel but sufficiently spaced from said top to rotate; second impeller means positioned within said vessel immediately superjacent to the bottom of said vessel but sufficiently spaced from said bottom to rotate; third impeller means positioned within said vessel between said first and said second impeller means; paddle means positioned within said vessel between said second and said third impeller means; and means for rotating said first, second and third impeller means and said paddle means.

BRIEF DESCRIPTION OF THE DRAWING

In the annexed drawing, like references indicate like parts or features:

FIG. 1 is a partially cut-away, cross-sectioned side elevational view of a mixing apparatus embodying the present invention in a particular form; and FIG. 2 is a sectional view taken along line 2—2 of FIG. 1.

DESCRIPTION OF THE PREFERRED EMBODIMENT

The mixing apparatus of the present invention which, in its illustrated embodiment, is generally indicated at 10, comprises: vertical cylindrical tank 12; three-bladed impellers 14, 16 and 18 and four-bladed paddle 20 coaxially aligned on the vertical center line of tank 12; and annular fixed basket 22 spaced radially between paddle 20 and vertical cylindrical sidewall 24 of tank 12, all as hereinafter further explained.

Vertical cylindrical tank 12 includes tank top 26 removably mounted on sidewall 24 and bottom 28 formed integrally with sidewall 24. Tank top 26 has a flat interior surface 30. Bottom 28 has a concave interior surface 32. Tank top 26 is secured to vertical sidewall 24 by a plurality of bolts 34 which circumscribe the perifery of tank top 26. O-ring 36 is positioned between tank top 26 and vertical sidewall 24 to provide a seal. Tank 12 can be pressurized and/or heated depending on the desired use of the mixing apparatus 10. The length to diameter ratio of tank 12 can range from about 5:1 to about 1:1, but is preferably about 1:1. The construction of tank 12 is entirely conventional and dependent on the anticipated use for said tank. Although tank 12 is depicted herein as a vertical cylindrical tank, it is to be understood that the overall shape of tank 12 is not critical provided such shape does not interfer with the ability of mixing apparatus 10 to achieve continuous stirred tank reactor performance. Tank 12 can have, for example, a spherical shape.

Tank 12 has an inlet 40 and an output 42 in the bottom 28 of tank 12. Inlet 40 and outlet 42 are provided for introducing a first fluid into tank 12 and removing such fluid from tank 12. In a gas/liquid system, the first fluid would be the liquid, and for a light liquid/heavy liquid system it would be the heavy liquid. Inlet 40 has an opening 44 in the interior surface 32 of bottom 28 which is positioned in the near vicinity of, or adjacent to impeller 16. Outlet 42 includes vertically extending dip tube 46 which has an opening 48 in the same horizontal plane as impeller 18.

Tank 12 also has an inlet 50 and an output 52 in tank top 26. Inlet 50 and outlet 52 are provided for introducing a second fluid into tank 12 and removing such fluid from tank 12. In a gas/liquid system, this second fluid would be the gas. In a light liquid/heavy liquid system, this second fluid would be the light liquid. Inlet 50 includes a vertically extending dip tube 54 which has an opening 56 in the horizontal plane of impeller 16. Outlet 52 has an opening 58 in the surface 30 of tank top 26.

Impellers 14, 16, 18 and paddle 20 are mounted on agitator shaft 60 which extends along the vertical center line of tank 12 from tank top 26 to surface 32 of bottom 28. Agitator shaft 60 depends from pulley 62 and rotary seal 64 which are entirely conventional in design. Belt 66 extends from pulley 62 to a motor (not shown) which is also entirely conventional in design and is used to drive belt 66 and thereby rotate pulley 62 and agitator shaft 60.

Impeller 14 has three impeller blades 70, 72 and 74 which are pitched downwardly. The radial diameter of impeller 14 can range from the diameter of agitator shaft 60 up to the internal diameter of sidewall 24. The radial diameter of impeller 14 is, however, preferably from about 20% to about 40% of the internal diameter of sidewall 24 and, advantageously, is about one-third of the internal diameter of sidewall 24. Alternatively to the three blades 70, 72 and 74 illustrated in the drawings, impeller 14 can have as few as two impeller blades and as many as eight impeller blades, but preferably has three or four impeller blades. The downward pitch of these blades is dependent upon the number of blades employed and their radial diameter, as well as the degree of mixing desired from impeller 14. Preferably, the downward pitch of these blades ranges from about 15° to about 60° and, advantageously, from about 30° to about 45°.

Impeller 16 has three impeller blades 82, 84 and 86 which are pitched upwardly. The radial diameter of impeller 16 is preferably from about 20% to about 40% of the internal diameter of sidewall 24 and, advantageously, is about one-third of the internal diameter of sidewall 24. Alternatively to the three blades 82, 84 and 86 illustrated in the drawings, impeller 16 can have as few as two impeller blades and as many as eight impeller blades, but preferably has three or four impeller blades. The upward pitch of these blades is dependent upon the number of blades employed and their radial diameter, as well as the degree of mixing desired from impeller 16. Preferably, the upward pitch of these blades ranges from about 15° to about 60° and, advantageously, from about 30° to about 45°.

Impeller 18 has three impeller blades 76, 78 and 80 which are pitched downwardly. The radial diameter of impeller 18 is preferably from about 20% to about 40% of the internal diameter of sidewall 24 and, advantageously, is about one-third of the internal diameter of sidewall 24. Alternatively to the three blades 76, 78 and 80 illustrated in the drawings, impeller 18 can have as few as one impeller blade and as many as eight impeller blades, but preferably has three or four impeller blades. The downward pitch of these blades is dependent upon the number of blades employed and their radial diameter, as well as the degree of mixing desired from impeller 14. Preferably, the downward pitch of these blades ranges from about 15° to about 60° and, advantageously, from about 30° to about 45°.

Paddle 20 has rectangular flat paddles blades 88, 90, 92 and 94 which extend radially outwardly from agitator shaft 60 at an angle of 90° from each other with their long dimension vertically aligned with shaft 60. Alternatively, paddle 20 can have as few as two paddle blades, and as many as eight, ten or twelve paddle blades, but three and particularly four paddle blades are preferred. The radial diameter of paddle 20 is preferably from about 20% to about 40% of the internal diameter of sidewall 24 and, advantageously, is about one-third the internal diameter of sidewall 24.

Impeller 14 is positioned immediately subjacent to the interior surface 30 of tank top 26, but sufficiently spaced from surface 30 so that it can rotate. Impeller 16 is positioned immediately superjacent to the interior surface 32 of bottom 28, but sufficiently spaced from surface 32 so that it can rotate. Paddle 20 is positioned directly above impeller 16. Impeller 18 is positioned directly above paddle 20 and is spaced from impeller 14.

Annular fixed basket 22 has a pair of concentric vertical cylindrical mesh screens 98 and 100 attached to and positioned between a pair of horizontally extending parallel rings 102 and 104. Ring 104 is secured to sidewall 24 by supports 106, 108 and 110 which extend radially from the outer periphery of ring 104 and are spaced 120° from each other. Similar supports (not shown) extend from the outer periphery of ring 102 and are spaced 120° from each other for securing ring 102 to sidewall 24. Basket 22 is filled with particulate catalytic material 112 to provide a fixed bed. Although the particulate material 112 is referred to as catalytic, it will be understood by those skilled in the art that any type of solid reactant or sorbent material, for example, could be used in place of catalyst 112. The radial spacing between screens 98 and 100 is dependent upon the size of the particulate material 112. For example, the spacing between screens 98 and 100 should be relatively small if the catalyst 112 has a relatively fine particulate size, while the spacing should be relatively large for coarse particles. The vertical extent between the tops and bottoms of screens 98 and 100 is the same as the vertical extent between the tops and the bottoms of paddle blades 88, 90, 92 and 94, i.e., paddle blades, 88, 90, 92 and 94 are horizontally aligned with screens 98 and 100.

In operation, tank 12 is filled with the desired fluids and catalyst (if any). If catalyst is not employed in the desired mixing operation, basket 22 can be removed. Gases (gas/liquid system) or light liquids (light liquid/heavy liquid system) are introduced into tank 12 through inlet 50 and removed through outlet 52. Liquids (gas/liquid system) or relatively heavy liquids (light liquid/heavy liquid system) are introduced into tank 12 through inlet 40 and removed through outlet 42. A motor (not shown) drives belt 66 which in turn rotates pulley 62 and agitator shaft 60. The rotation of agitator shaft 60 results in the rotation of impellers 14, 16 and 18 and paddle 20. Paddle 20 forces fluid radially outwardly toward and through basket 22. The fluid flows through screens 98 and 100 and catalyst 112 and then along sidewall 24 both upwardly and downwardly. The downwardly flowing fluid flows toward impeller 16 which forces the fluid upwardly towards paddle 20. Fluid flowing upwardly along sidewall 24 from catalyst basket 22 flows toward impellers 14 and 18. Fluid contacting impellers 14 and 18 is forced downwardly towards paddle 20. The combined movement of impellers 14, 16 and 18 and paddle 20 in conjunction with the circulation of the internal fluid through basket 22 and along sidewall 24 and surfaces 30 and 32 results in continuous stirred tank reactor performance when the rotation of impellers 14, 16 and 18 and paddle 20 is effected at an appropriate rate. The appropriate rate for obtaining continuous stirred tank reactor performance is dependent upon the dimensions of impeller 14, 16 and 18, paddle 20, catalyst basket 22, and tank 12 as well as the densities and viscosities of the fluids being agitated and the particulate size and packing density of catalyst 112. The determination of such appropriate rotation rate can be readily determined by one skilled in the art.

An advantage of the mixing apparatus of the present invention is the positioning of impeller 14 immediately subjacent to the interior surface 30 of tank top 26. Impeller 14 is particularly suitable for dispersing gaseous or light liquid materials that stagnate near the top 26 of tank 12. Another advantage of the mixing apparatus of the present invention is the positioning of impeller 16 immediately superjacent to the interior surface 32 of bottom 28 of tank 12. Impeller 16 is particularly useful in dispersing relatively heavy liquids that tend to stagnate on the interior surface 32 of bottom 28. Without the positioning of impeller 14 immediately subjacent to surface 30 and the positioning of impeller 16 immediately superjacent to surface 32, the achievement of continuous stirred tank reactor performance is not possible with the mixing apparatus of the present invention.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A mixing apparatus capable of providing continuous stirred reactor performance comprising:
   a vessel;
   vertically extending agitator shaft means rotatably mounted in said vessel;
   first impeller means mounted on said shaft means and positioned within said vessel immediately subjacent to the top of said vessel but sufficiently spaced from said top to rotate, said first impeller means comprising impeller blades having a downward pitch of from about 15° to about 60°;
   second impeller means mounted on said shaft means and positioned within said vessel immediately superjacent to the bottom of said vessel but sufficiently spaced from said bottom to rotate, said second impeller means comprising impeller blades having an upward pitch of from about 15° to about 60°;
   third impeller means mounted on said shaft means and positioned within said vessel between said first and said second impeller means;
   paddle means mounted on said shaft means and positioned within said vessel between said second and said third impeller means, said paddle means comprising rectangular flat blades having their long dimension vertically aligned with said shaft means; and
   means for rotating said first, second and third impeller means and said paddle means sufficiently to provide continuous stirred reactor performance.

2. The apparatus of claim 1 wherein said vessel is a vertical cylindrical tank.

3. The apparatus of claim 1 wherein said vessel is a pressure vessel.

4. The apparatus of claim 1 wherein said vessel is a heated pressure vessel.

5. The apparatus of claim 1 wherein said vessel is a vertical cylindrical tank, the internal diameter of said tank being substantially equal to the internal height of said tank.

6. The apparatus of claim 5 wherein the radial diameter of said paddle means is from about 20% to about 40% of the diameter of said tank.

7. The apparatus of claim 5 wherein the radial diameter of said paddle means is about one-third the diameter of said tank.

8. The apparatus of claim 5 wherein the radial diameter of said first impeller means ranges up to the diameter of said tank.

9. The apparatus of claim 5 wherein the radial diameters of said second and third impeller means are from about 20% to about 40% of the diameter of said tank.

10. The apparatus of claim 5 wherein the radial diameters of said second and third impeller means are equal to about one-third the diameter of said tank.

11. The apparatus of claim 5 wherein the radial diameters of said first, second and third impeller means are equal to about 20% to about 40% of the diameter of said tank.

12. The apparatus of claim 5 wherein the radial diameters of said first, second and third impeller means are equal to about one-third of the diameter of said tank.

13. The apparatus of claim 1 wherein said vessel is a vertical cylindrical tank, said first, second and third impeller means and said paddle means being coaxially aligned on the vertical centerline of said tank.

14. The apparatus of claim 1 with first fluid outlet means having an opening in the same or substantially the same horizontal plane as the impeller blades of said third impeller means.

15. The apparatus of claim 1 with second fluid inlet means having an opening in the same or substantially the same horizontal plane as the impeller blades of said second impeller means.

16. The apparatus of claim 1 with first fluid inlet means in the bottom of said vessel.

17. The apparatus of claim 1 with second fluid outlet means in the top of said vessel.

18. The apparatus of claim 1 with particulate retaining means radially spaced from said paddle means.

19. The apparatus of claim 18 wherein said particulate retaining means is sufficiently spaced from the wall of said vessel to permit the flow of fluid between said wall and said retaining means.

20. The apparatus of claim 19 wherein the blades of said paddle means are substantially horizontally aligned with said catalyst basket.

21. The apparatus of claim 18 wherein said particulate retaining means is substantially horizontally aligned with the blades of said paddle means.

22. The apparatus of claim 18 wherein said particulate retaining means comprises a catalyst basket spaced radially from the blades of said paddle means.

23. The apparatus of claim 22 wherein said catalyst basket is sufficiently spaced from the wall of said vessel to permit the flow of fluid between said wall and said basket.

24. The apparatus of claim 1 wherein said paddle means includes from 2 to about 8 radially extending paddle blades.

25. The apparatus of claim 1 wherein said paddle means includes four radially extending flat paddle blades spaced about 90° from each other.

26. The apparatus of claim 1 wherein said first impeller means includes from 2 to about 8 impeller blades pitched downwardly.

27. The apparatus of claim 1 wherein said first impeller means includes 3 or 4 impeller blades pitched downwardly.

28. The apparatus of claim 1 wherein said second impeller means includes from 2 to about 8 impeller blades pitched upwardly.

29. The apparatus of claim 1 wherein said second impeller means includes 3 or 4 impeller blades pitched upwardly.

30. The apparatus of claim 1 wherein said third impeller means includes from one to about 8 impeller blades pitched downwardly.

31. The apparatus of claim 1 wherein said third impeller means includes 3 or 4 impeller blades pitched downwardly.

32. The apparatus of claim 1 wherein said first, second and third impeller means and said paddle means are coaxially aligned; said paddle means being immediately superjacent to said second impeller means, immediately subjacent to said third impeller means and spaced from said first impeller means.

* * * * *